March 20, 1928. 1,663,065
F. VERJROSTA
BLOCKING AND CULTIVATING DEVICE
Filed Aug. 5, 1927
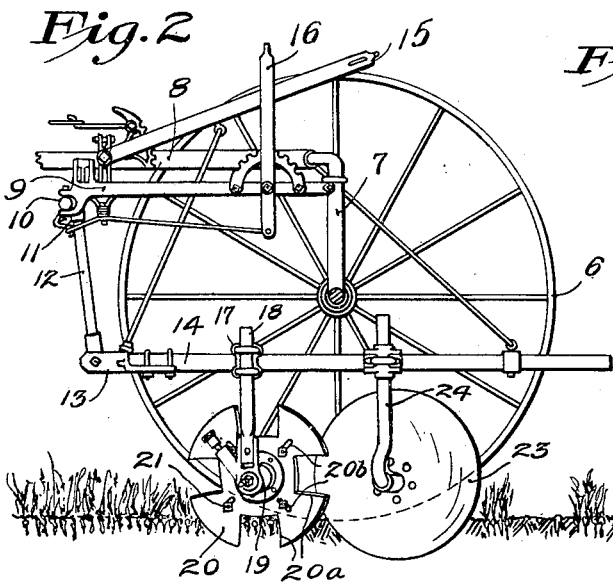
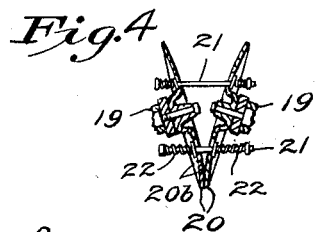
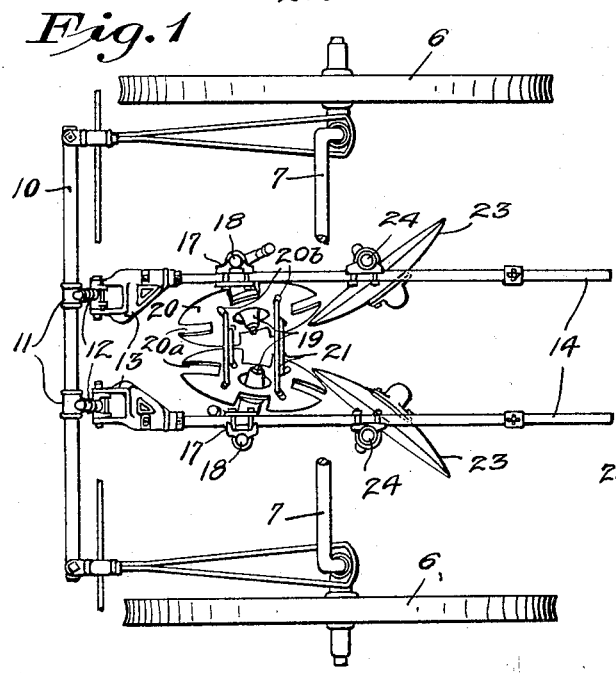
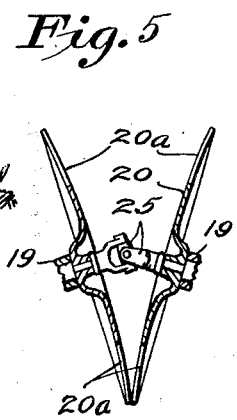
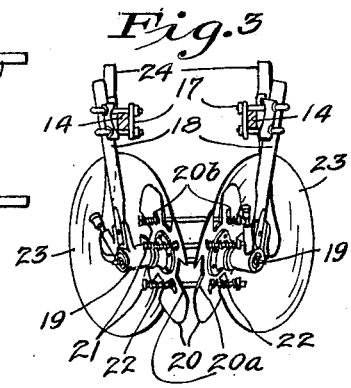
Inventor
Frank Verjrosta
By his Attorneys
Williamson Reif Williamson Patented Mar. 20, 1928.

1,663,065

UNITED STATES PATENT OFFICE.

FRANK VERJROSTA, OF SILVER LAKE, MINNESOTA.

BLOCKING AND CULTIVATING DEVICE.

Application filed August 5, 1927. Serial No. 210,816.

This invention relates to a device for blocking and cultivating plants in a row and has special application to cultivators for sugar beets and other plants.

It is an object of my invention to provide a simple but highly efficient device which will thin or block the rows of plants and will simultaneously cultivate and hill the rows in an efficient manner.

A further object is to provide a thinning and blocking attachment for cultivators which will remove plants at regular intervals from the row, blocking the row and leaving uniformly spaced clumps of plants therein.

These and other objects and advantages of the invention will be apparent from the following description made in connection with the accompanying drawings, in which like reference characters refer to similar parts throughout the several views, and in which, Fig. 1 is a plan view of the main portion of a cultivator having an embodiment of the invention applied thereto;

Fig. 2 is a side elevation of the same;

Fig. 3 is a front elevation of the blocking and cultivating discs;

Fig. 4 is a cross section taken through the blocking discs; and

Fig. 5 is a cross section taken through a modified slightly different form of blocking discs.

In the drawings, a standard form of cultivator is illustrated, of the sulky type having the two supporting wheels 6 pivotally mounted on an arch axle 7. The yoke 8 of the frame is connected to arch axle 7 extending forwardly thereof and carrying a suitable rig support 9. Rig support 9 includes a forward cross bar 10 from which the front ends of the rigs are supported. As shown, sleeves 11 are slidably disposed on cross bar 10 having depending swingable arms 12 secured thereto, said arms 12 being connected to coupling members 13 attached to the front ends of the cultivator beams 14. Coupling members 13 are provided with pivot members having horizontal axes disposed transversely of the cultivator. The hitch for cultivator beams 14 is shown as of the pendent type whereby direct pull is placed upon the rigs and the set or pitch of the cultivator implements carried may be maintained constant regardless of the level at which the cultivator beams are maintained. A lifting lever 15 controls the lifting of the rigs and a spacing lever 16 connected to suitable mechanism some of which is not shown, enables the cultivator beams 14 to be moved laterally to regulate the distance between the rigs, said beams being at all times in parallel relation and sleeves 11 sliding on the cross bar 10.

Adjacent the forward ends of cultivator beams 14 I mount a pair of suitable clamping members 17 to which are secured the depending shanks 18. Shanks 18 carry at their lower ends elongated bearings 19 in which the shafts of a pair of opposed rotary hoes 20 are journaled. Hoes 20 are preferably in the form of discs each having a plurality of circumferentially spaced recesses extending from the peripheral edges inwardly, said recesses being of sufficient width to accommodate a small clump of plants. The discs are set at forwardly converging angles and furthermore have their axes tilted, the inner or opposing ends of said shafts being disposed at a higher level than the outer ends. Thus, the discs 20 are disposed in very close relation at their lower and forward edges, while diverging from front to rear and from bottom to top. The recesses 20$^a$ on the two discs are spaced the same distance apart and are of the same size so that the recesses of the two discs will register when driven in unison. In Figs. 1 to 4, I show a simple but efficient means for connecting the discs for driving in unison which will withstand heavy wear. A plurality of parallel elongated bolts 21 shown as 4 in number, and rectangularly arranged extend through radial slots 20$^b$ in the two discs, said bolts being of sufficient length to accommodate a plurality of coiled springs 22 interposed between the ends of the bolts and the outer sides of the adjacent discs.

Directly behind my blocking discs 20 I support from the cultivator beams a pair of forwardly convergent cultivating discs 23 said cultivating discs having their forward ends inwardly lapped in respect to the rear edges of blocking discs 20 and said cultivating discs having their rear edges extending outwardly of discs 20 to cultivate the rows and hill the plants. Discs 23 are preferably pivotally mounted from depending shanks 24 suitably clamped to intermediate portions of the cultivator beams 14. The recesses 20$^a$ of the blocking discs may be spaced different distances apart than that shown and may be multiplied and increased to vary the thinning or blocking of the plants according to the needs.

The operation of my device may be briefly described as follows:

The cultivator is drawn over a row of standing plants with the blocking discs and cultivating discs disposed in the manner illustrated in the drawings. The blocking discs 20 will be forwardly rotated by their movement over the ground through frictional engagement with the ground and will move in unison, their respective recesses 20ª registering at the point of contact with the ground adjacent their forward and lower ends, the unrecessed peripheral edges of discs 20 being forwardly convergent and downwardly convergent, to cultivate the row. The plants are moved rearwardly and laterally, being removed from the ground and are carried to the sides of the row, being delivered to the cultivating discs 23 which further cultivate the row and hill the same, distributing the removed plants between the rows. Obviously, the recessed portions of the disc cause small clumps of plants to be left standing at regular intervals along the row, the width of the recesses, of course, determining the size of the clump of plants left. My device, in combination with the cultivator of the type shown permits the rider to readily adjust the position of the rigs by means of the spacing lever 16 to precisely follow the row and moreover permits the depth of the individual rigs or the rigs collectively to be controlled by means of the lifting levers 15.

In raising sugar beets the blocking and thinning has required a great amount of labor at considerable cost, since the beets must be planted close together and heretofore have been manually blocked. With my device a single operator can do the work which formerly occasioned the employment of many hands.

As illustrated in Figs. 1 to 4, inclusive, the bolts 21 will slide slightly in the slot being disposed at the inner ends of the slots when the slots are farthest apart, and adjacent the outer ends when the slots are disposed in closest proximity. Springs 22 readily permit the discs 20 to be revolved in unison by means of the connecting bolts 21.

In the form shown in Fig. 5 obviously the universal joint connects the two discs for uniform driving. The wear, however, on this joint is very heavy and it may be found that the bolts constitute a more preferable way of connecting the two discs together for driving in unison.

From the foregoing description it will be seen that I have invented a simple but highly efficient blocker and cultivator for sugar beets and other plants adapted to simultaneously block and cultivate the plants in an exceedingly short time. The cooperation between the blocking discs 20 and the cultivating disc 23 both in distributing and removing the thinned plants and in cultivating the row is of considerable importance and the overlapping relation of said discs with the forward ends of the cultivator discs lapping the rear ends of the blocking discs is accountable for the results above referred to.

It will, of course, be understood that various changes may be made in the form, details, arrangement and proportions of the parts without departing from the scope of the invention.

What is claimed is:

1. In a device of the class described, a wheeled frame a pair of cultivator beams supported from said frame and a pair of revoluble oppositely disposed discs having circumferentially spaced recesses extending inwardly from their peripheral edges, said discs being supported from said cultivator beams with their forward portions in close relation and diverging rearwardly and upwardly, and a pair of cultivator discs spaced some distance apart also supported from said cultivator beams behind said first mentioned discs and diverging rearwardly, said cultivator discs having their forward portions lapping the rear portions of said first mentioned discs on the inner sides thereof.

2. In a device of the class described, a frame adapted to be supported from the ground, a pair of revoluble discs mounted from said frame with their forward edges in close relation and with their rearward edges spaced some distance apart, said discs each having a plurality of circumferentially spaced recesses extending inwardly from the peripheral edge, a plurality of circumferentially disposed pins extending through the medial portions of both of said discs and projecting beyond the outer surfaces thereof and coiled springs interposed between the ends of said pins and said outer surfaces and surrounding said pins.

In testimony whereof I affix my signature.

FRANK VERJROSTA.